United States Patent
Aerts et al.

(10) Patent No.: US 6,822,013 B1
(45) Date of Patent: Nov. 23, 2004

(54) POLYOL COMBINATION

(75) Inventors: Rene Aerts, Louvain-la-Neuve (BE); Mark Maria Herman Alma Boelens, Louvain-la-Neuve (BE); Gyula Imre Dreisziger, Louvain-la-Neuve (BE); Parminder Singh Sangha, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/130,520

(22) PCT Filed: Nov. 17, 2000

(86) PCT No.: PCT/EP00/11544
§ 371 (c)(1),
(2), (4) Date: May 20, 2002

(87) PCT Pub. No.: WO01/38413
PCT Pub. Date: May 31, 2001

(30) Foreign Application Priority Data

Nov. 22, 1999 (EP) .............................. 99203905

(51) Int. Cl.$^7$ .............................................. C08G 18/28
(52) U.S. Cl. ....................................... 521/174; 521/130
(58) Field of Search ................................. 521/174, 130

(56) References Cited

U.S. PATENT DOCUMENTS 5,369,138 A * 11/1994 Gansen ........................ 521/159
5,814,676 A * 9/1998 Jacobs et al. ................ 521/174
6,337,356 B1 * 1/2002 Zaschke et al. .............. 521/174
6,417,241 B1 * 7/2002 Huygens et al. ............. 521/137

FOREIGN PATENT DOCUMENTS

| EP | 0 555 721 A1 B | 8/1993 |
| EP | 0 731 120 A | 9/1996 |
| WO | 95/15990 | 6/1995 |

OTHER PUBLICATIONS

Ron Herrington and Kathy Hock, "Flexible Polyurethane Foams", Dow Plastics, 1991.

* cited by examiner

*Primary Examiner*—John M. Cooney, Jr.

(57) ABSTRACT

A polyol combination having up to a total of about 100 parts by weight (1) from about 95.1 to about 99.9 parts by weight of a first polyol having a nominal average functionality higher than about 4.5, an equivalent molecular weight in the range of from about 1500 to about 2500, a hydroxyl value in the range of from about 25 to about 35 mg KOH/g and an ethylene oxide content in the range of from about 10 to about 30% by weight based on total weight of said first polyol, and (2) from about 0.1 to about 4.9 parts by weight of a second polyol having a nominal average functionality in the range of from about 2.2 to about 6, an equivalent molecular weight in the range of from about 1000 to about 3000 and an ethylene oxide content of at least 50% by weight based on total weight of said second polyol, wherein the polyol combination is essentially free of stably dispersed polymer particles. The polyol combination is very suitable for application in formulations for preparing polyurethane foams for sound deadening applications.

10 Claims, 2 Drawing Sheets

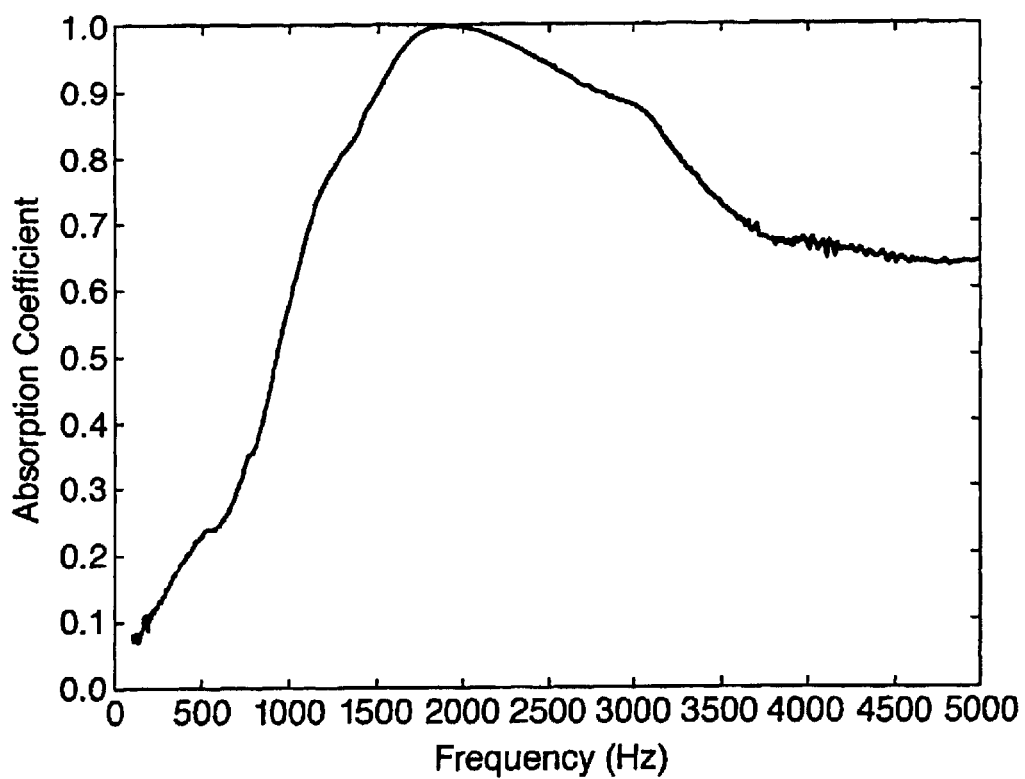

Figure 1:
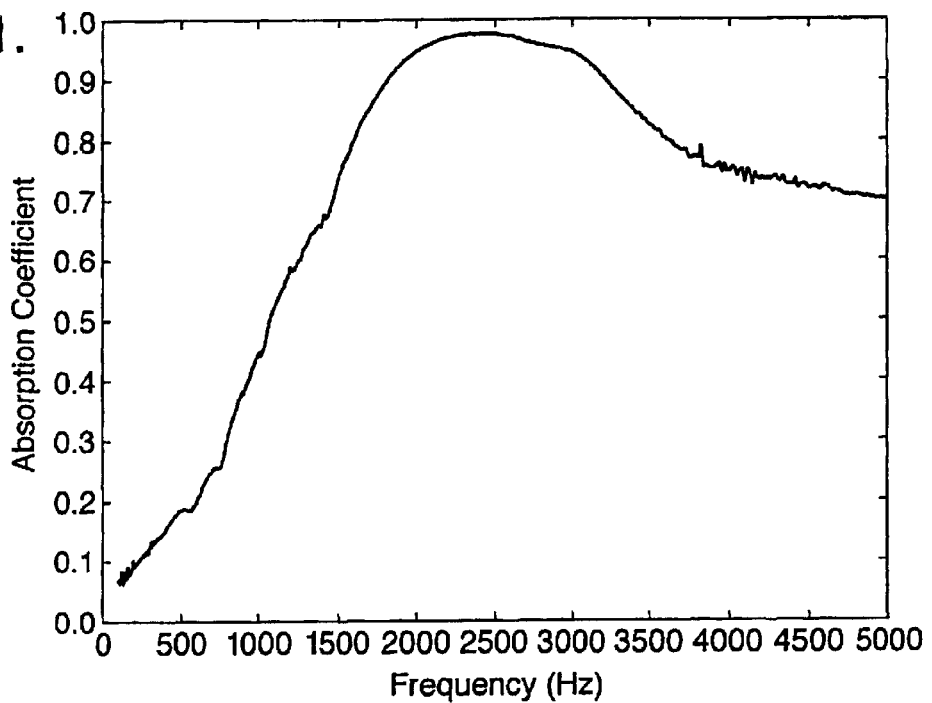

POLYOL COMBINATION

FIELD OF THE INVENTION

The present invention concerns a polyol combination, the preparation of polyurethane foam from this polyol combination, the foam itself and shaped articles comprising the foam.

BACKGROUND OF THE INVENTION

The present invention concerns a polyol combination which is very suitable for preparing shaped, flexible polyurethane articles by moulding techniques.

Moulding techniques for preparing shaped polyurethane articles are well known in the art. These techniques could be divided into to main groups: hot cure moulding and cold cure moulding techniques. The present invention particularly concerns a polyol combination which can suitably be applied in cold cure moulding, although application thereof in hot cure moulding would also be possible.

Typically, hot cure moulding techniques involve pouring a foaming mixture into a mould, after which a significant amount of external heat is applied to the mould, for instance by placing the mould in an oven at 180–300° C., in order to effect sufficient surface curing of the foam in the mould so that it can be removed from the mould quickly. Typical mould temperatures when pouring the reaction mixture into the mould are from 25 to 45° C. Cold cure moulding techniques, also sometimes referred to as high resilience moulding techniques, require much less external heat to be applied to the mould. This is achieved by using more reactive polyol molecules, so that the chemical reactions proceed faster and less overall cure energy is needed. Typical cold cure moulding temperatures range from 40 to 70° C.

SUMMARY OF THE INVENTION

The polyol combination of the present invention is particularly useful to prepare tailor made polyurethane articles to be used for sound deadening purposes in cars and trucks. Namely, it has already been and replace it with recognized for a long time that the interior noise level of a vehicle has comfort and safety implications for its driver. As a result hereof, car and truck manufacturers are continuously looking for means to further reduce the noise level in the interior parts of cars and trucks. A major component of the noise inside a car is the airborne noise originating from the engine compartment. This can be readily reduced by installing a carpet having a backing of sound deadening material, such as e.g. a polyurethane foam, which carpet covers the metal partition between the engine and driver/passenger compartment.

For a polyurethane foam to be suitable as sound deadening material it should on the one hand have sufficient density to absorb the sound waves causing the noise. At this moment the lowest achievable overall densities of commercially applied sound deadening foams are around 50–55 kg/m$^3$. Densities of this order of magnitude are considered necessary to attain sufficient sound deadening properties. On the other hand there is a constant effort in the sound deadening market to reduce the foam density, whilst still maintaining the requirements as regards foam processing and sound absorption. One of the objects underlying the present invention, therefore, is to provide a polyol combination which enables the production of sound deadening polyurethane sheets, whereby the processability of the foam formulation containing the polyol combination is very good, whilst the polyurethane sheet prepared has excellent sound deadening properties at very low densities.

This object has been achieved by a polyol combination comprising two polyol components with distinct properties and essentially no stably dispersed polymer particles, i.e. the polyol combination of the present invention is free of any polymer polyol component.

DESCRIPTION OF THE INVENTION

Accordingly, the present invention relates to a polyol combination comprising up to a total of 100 parts by weight
(1) 95.1 to 99.9 parts by weight of a first polyol (hereinafter "said first polyol") having a nominal average functionality higher than 4.5, an equivalent weight in the range of 1500 to 2500, a hydroxyl value in the range of 25 to 35 mg KOH/g and an ethylene oxide content in the range of 10 to 30% by weight based on total weight of said first polyol, and
(2) 0.1 to 4.9 parts by weight of a second polyol (hereinafter "said second polyol") having a nominal average functionality in the range of 2.2 to 6, an equivalent molecular weight in the range of 1000 to 3000 and an ethylene oxide content of at least 50% by weight based on total weight of said second polyol, wherein the polyol combination is essentially free of stably dispersed polymer particles.

In EP-A-0 731 120 highly elastic polyurethane foams are disclosed obtainable by reacting polyisocyanates with a blend of polyols, a specific crosslinking compound (suitably diethanolamine), water and/or volatile organic blowing agents and optionally polymer polyols and usual additives and auxiliaries. The blend of polyols comprises:
(a) at least one polyether polyol having a nominal functionality of 3.5–8, an ethylene oxide content of 10–30% by weight and an equivalent weight of 500–4000 and containing predominantly primary hydroxyl groups; and
(b) at least one polyether polyol having a nominal functionality of 2–8, an ethylene oxide content of 50–95% by weight and an equivalent weight of 200–3000 and containing predominantly primary hydroxyl groups.

The above formulation is suitably used to prepare slabstock foams. From the working examples it becomes clear that the presence of a polymer polyol component is preferred and if such component is absent the amount of component (b) will not be less than 5 parts by weight per 100 parts by weight of polyol formulation. The low densities attained with the above formulation (in the working examples densities as low as 21.5 kg/m$^3$ are attained) are too low to make the foam useful for sound isolation in a car. One of the important factors responsible for this low density is the relatively high amount of polyisocyanate used resulting in increased blowing capacity from the water/isocyanate reaction; according to EP-A-0 731 120 an isocyanate index of 90–130 is typically applied. In view of the high market prices of polyisocyanates such foam would already be considered too expensive for sound deadening purposes. Moreover, due to the low densities the sound deadening properties of the foam would be insufficient. From the disclosure of EP-A-0 731 120 it is furthermore clear that use of the polyurethane foams for sound deadening purposes is not envisaged. The foams prepared are highly elastic and obviously designed for applications wherein high resilience foams are useful.

In EP-A-0 555 721 a polyol combination is disclosed comprising (i) 5 to 30% by weight of a polyether polyol containing at least two hydroxyl groups and having a hydroxyl value of less than 150 and an ethylene oxide content of at least 50% by weight (based on total alkylene oxide used) and (ii) 70 to 95% by weight of a polyether polyol containing at least two hydroxyl groups and having a hydroxyl value of 14–50 and an ethylene oxide content of 5 to 25% by weight (based on total alkylene oxide used). This polyol combination is typically used in a formulation for preparing elastic polyurethane foams by cold cure moulding techniques, which foams are particularly suitable for use in full foam seats, top pads for the seats and restraints for back and head in cars. No reference is made to use for sound deadening purposes and the problems and requirements associated with that specific application.

Both polyols of the polyol combination of the present invention are poly(oxyalkylene)polyether polyols and can be obtained by methods known in the art. Typically, methods for preparing polyether polyols involve reacting a starting compound having a plurality of active hydrogen atoms with propylene oxide, optionally together with one or more other alkylene oxides like ethylene oxide or butylene oxide. Suitable starting compounds include polyfunctional alcohols, generally containing 2 to 8 hydroxyl groups. Examples of such alcohols are glycols, glycerol, pentaerythritol, trimethylolpropane, triethanolamine, sorbitol, mannitol, etc. Usually a strong base like potassium hydroxide is used as a catalyst in this type of reaction.

Said first polyol of the polyol combination of the present invention suitably has an average nominal functionality of at most 8. The expression "nominal average functionality" as used in this context refers to the number of reactive hydroxyl groups per molecule of polyol, which corresponds with the average number of free hydroxyl groups present in the starter molecule(s). Preferably, said functionality is in the range of 5 to 7. The hydroxyl value of said first polyol suitably is in the range of 26 to 33 mg KOH/g, more suitably 28 to 32 mg KOH/g.

The ethylene oxide content of said first polyol amounts to 10 to 30% by weight based on total weight of said first polyol, preferably 15 to 25% by weight. Such ethylene oxide can be randomly distributed across the polyether polyol polymer chain, but can also be present almost exclusively as terminal ethylene oxide. The latter can be attained by adding ethylene oxide only at the end of the alkylene oxide, normally propylene oxide, polymerization reaction. This is also sometimes referred to as "tipping" with ethylene oxide. As a result, the polyol chains are capped with poly (oxyethylene) moieties. For the purpose of the present invention it is preferred that essentially all ethylene oxide present in said first polyol is present as terminal poly (oxyethylene) moieties.

The equivalent weight of said first polyol suitably is not more than 2300 and preferably not more than 2000, while a preferred minimum equivalent weight is 1600.

Said second polyol suitably has an ethylene oxide content of at least 60% by weight (wt %), preferably at least 65 wt % and more preferably at least 70 wt %, while suitably it is less than 95 wt % and preferably less than 90 wt %.

The nominal average functionality of said second polyol suitably is in the range of 2.5 to 5, preferably 2.6 to 4. The equivalent molecular weight suitably is in the range of 1100 to 2500, preferably 1200 to 2000. Said first polyol suitably has a hydroxyl value of less than 200, preferably less than 100, more preferably less than 80, especially less than 50 mg KOH/g. Suitably, said first polyol has a hydroxyl value of at least 10, preferably at least 15, more preferably at least 20, especially at least 25 mg KOH/g.

Preferably, the polyol combination comprises, up to a total of 100 parts by weight, 95.5 to 99.5 and more preferably from 96.5 to 98.5 parts by weight of said first polyol and 0.4 to 3, more preferably 1.5 to 3.5, parts by weight of said second polyol.

The present invention also relates to a formulation for preparing a flexible polyurethane foam comprising
(a) 100 parts by weight of the polyol combination as defined herein before;
(b) 2 to 6 parts by weight of water;
(c) 0 to 3 parts by weight of crosslinking agent(s);
(d) 0.01 to 2.5 parts by weight of polyurethane catalyst(s); and optionally
(e) further usual auxiliaries.

The use of water as a (chemical) blowing agent is well known. Water reacts with isocyanate groups according to the well known $NCO/H_2O$ reaction, thereby releasing carbon dioxide which causes the blowing to occur. A major advantage of the present invention is that the specific polyol combination of the invention enables higher water contents (up to 6 pbw per 100 pbw of polyol combination) which enables the production of sound deadening polyurethane foams having densities significantly lower than those of the present commercial sound deadening foams, i.e. below 50 $kg/m^3$. With the above formulation foam densities below 45 $kg/m^3$ and even below 40 $kg/m^3$ can be attained.

The use of cross-linking agents in the production of polyurethane foams is well known. Polyfunctional alkanol amines are known to be useful for this purpose. Preferred amines which may be included in the polyol formulation to aid or maintain the miscibility of the first and second polyols include diethanolamine, often abbreviated as DEOA, triethanolamine, often abbreviated as TEOA, and glycerol.

Polyurethane catalysts are known in the art and include many different compounds. An extensive list of polyurethane catalysts is, for instance, given in U.S. Pat. No. 5,011,908. A preferred catalyst is an amine, especially a tertiary amine, catalyst. Preferred amine catalysts include an amine group substituted by at least two optionally-substituted, preferably unsubstituted, lower alkyl groups which may be the same or different, but are preferably the same. A lower alkyl group may have up to 8, preferably up to 6, more preferably up to 4, carbon atoms, with methyl and ethyl groups being especially preferred. A tertiary amine catalyst may be selected from bis(2,2'-dimethylamino)ethyl ether, trimethylamine, triethylamine, triethylenediamine, dimethylethanolamine, N,N',N'-dimethylaminopropylhexahydrotriazine and N,N-dimethylcyclohexylamine. Examples of commercially available tertiary amine catalysts are those sold under the trade names NIAX, TEGOAMIN, JEFFCAT and DABCO (all trademarks). Within the polyurethane catalysts and even within the tertiary amine catalysts a distinction can be made between gellation catalysts and blowing catalysts. Gellation catalysts are catalysts which predominantly promote the gellation of the foaming mixture, i.e. which promote the reaction between polyols and polyisocyanate. Blowing catalysts predominantly promote the $NCO/H_2O$ reaction, whereby carbon dioxide is released which causes the blowing to occur.

Other usual auxiliaries may include fillers, flame retardants, foam stabilisers (surfactants) and colourants. Organosilicone surfactants are most conventionally applied as foam stabilisers in polyurethane production. A large variety of such organosilicone surfactants is commercially available. Usually, such foam stabiliser is used in an amount of up to 5% by weight based on the reaction mixture of polyol reactant and polyisocyanate reactant.

In a further aspect the present invention relates to a process for the preparation of a flexible polyurethane foam by reacting 100 parts by weight of the polyol combination as defined herein before, 2 to 6 parts by weight of water, 0 to 3 parts by weight of crosslinking agent(s) and a polyisocyanate component at an isocyanate index in the range of 55 to 90, preferably 60 to 80, in the presence of from 0.01 to 2.5 parts by weight of polyurethane catalyst(s) and optionally further usual auxiliaries.

The above process is preferably carried out by intimately mixing all components but the polyisocyanate, then adding the polyisocyanate and mixing this with the polyol formulation for a very short time (no foam formation should take place), subsequently injecting the resulting reaction mixture into a mould where the foaming reaction takes place and the shaped polyurethane article is formed and finally releasing the shaped article from the mould. Mixing of the various components is preferably carried out at ambient temperature, suitably in the range 20 to 25° C. The mould is suitably kept at a temperature of 20 to 75° C., preferably 30 to 70° C. and more preferably 35 to 65° C.

Polyisocyanates that may be used are those conventionally applied in the production of polyurethane foams. Useful polyisocyanates should contain at least two isocyanate groups and include both aliphatic (usually alkylene) and aromatic di-, tri-, tetra- and higher isocyanates known in the art to be suitably applied in the production of flexible polyurethane foams. Mixtures of two or more of such aliphatic and/or aromatic polyisocyanates may also be applied. Examples of suitable polyisocyanates, include 2,4-toluene diisocyanate (2,4-TDI), 2,6-TDI, mixtures of 2,4-TDI and 2,6-TDI, 1,5-naphthene diisocyanate, 2,4-methoxyphenyl diisocyanate, 4,4'-di-phenylmethane diisocyanate (MDI), 4,4'-biphenylene diisocyanate, 3,3'-dimethoxy-4,4'-biphenylene diisocyanate, 3,3'-dimethyl-4,4'-biphenylene diisocyanate and 3,3'-dimethyl-4,4'-diphenylmethane diisocyanate, 4,4',4"-tri-phenylmethane triisocyanate, 2,4,6-toluene triisocyanate, 4,4'-dimethyl-2,2',5,5'-diphenylmethane tetraisocyanate, polymethylene-polyphenylene polyisocyanate, carbodiimide modified isocyanates, MDI prepolymers and mixtures of two or more of these. Polymeric MDI, a mixture of polyisocyanates with MDI as the main component, may also be used. For the purpose of the present invention the use of MDI or a modified MDI is preferred. These are commercially available.

The polyisocyanate is used in such amount that the isocyanate index is in the range of 55 to 90, preferably in the range of 60 to 85, more preferably in the range 65 to 80.

The present invention finally also relates to shaped polyurethane articles whenever obtained by the process as defined above. Preferably, such shaped polyurethane article is a sound deadening carpet backing for automotive application.

DETAILED DESCRIPTION OF THE FIGURES

The invention is further illustrated by the following examples without limiting the scope of the invention to these particular embodiments.

In the examples the following polyols were used:

Polyol A a sorbitol initiated polyether polyol having an ethylene oxide content of 17 wt % (tipped), an OH value of 31 mg KOH/g, an equivalent weight of 1800 and a primary hydroxyl content of 75%

Polyol B a glycerol based polyether polyol having an OH value of 27 mg KOH/g, an ethylene oxide content of 14% (tip), an equivalent weight of 2100 and a primary hydroxyl content of 82%

Polyol C a glycerol based polyether polyol having an OH value of 36 mg KOH/g, an ethylene oxide content of 75% (random), an equivalent weight of 1550 and a primary hydroxyl content of 90%

As the polyisocyanate SUPRASEC X2530 was used. This is a modified MDI (SUPRASEC is a trademark).

EXAMPLE 1

Polyol, water, silicone surfactant and catalysts were blended into one stream, while the isocyanate formed another stream. Both streams were injected into a high pressure moulding machine (a Kraus-Maffei RIM Star 16/16 machine) and the resulting reaction mixture was injected into a cast aluminium mould (40 cm×40 cm×2.5 cm) having an inlet for the reaction mixture in one corner. The temperature of the mould was 58° C. The composition of the reaction mixture is indicated in table 1.

After 1 minute and 45 seconds the mould was opened and the shaped polyurethane article was taken out for evaluation. Firstly it was observed that the reaction mixture had filled the complete mould, thus indicating very good flow properties. A visual inspection of the foam learned that the foam surface was smooth and did not show any irregularities. No shrinkage of the foam had occurred either.

The density of the foam was measured and the foam was subjected to an Impedance Tube Measurement (ISO 10534) to check its sound absorption qualities. The results are indicated in FIG. 1.

Comparative Example 1

Example 1 was repeated except that Polyol B was used in stead of Polyol A. The exact composition of the reaction mixture used is indicated in Table 1.

Figure 2:
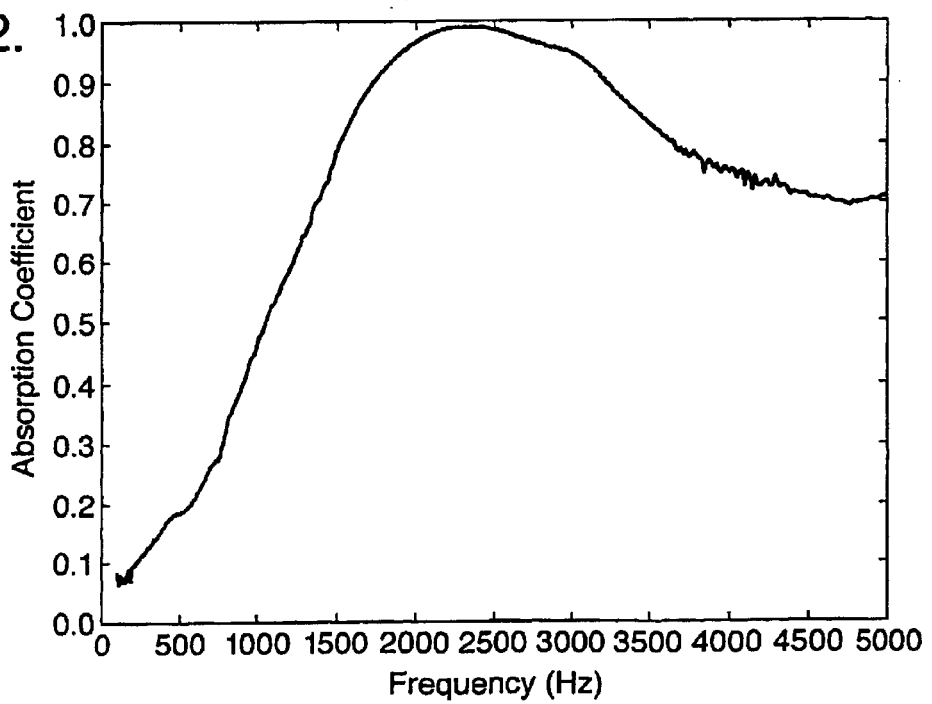

The results of the foam evaluation are indicated in Table 1, while the result of the sound absorption test is indicated in FIG. 2.

EXAMPLE 2

Example 1 was repeated except that an isocyanate index of 65 was applied instead of 70.

The results of the foam evaluation are indicated in Table 1, while the result of the sound absorption test is indicated in FIG. 3.

TABLE 1

Foaming mixtures and foam properties

|  | Ex. 1 | C-Ex. 1 | Ex. 2 |
| --- | --- | --- | --- |
| Polyol A (pbw) | 100 |  | 100 |
| Polyol B (pbw) |  | 100 |  |
| Polyol C (pbw) | 2.0 | 2.0 | 2.0 |
| water (pbw) | 5.5 | 4.5 | 5.5 |
| tert-amine gellation catalyst (pbw) | 0.35 | 0.30 | 0.35 |
| tert-amine blowing catalyst (pbw) | 0.15 | 0.15 | 0.15 |
| silicone surfactant (pbw) | 0.35 | 0.40 | 0.35 |
| SUPRASEC X2530 (index) | 70 | 75 | 65 |
| Properties |  |  |  |
| skin appearance | smooth | smooth | smooth |
| overall density (kg/m$^3$) | 37.9 | 50.8 | 38.8 |

From FIGS. 1 to 3 it can be seen that the sound absorption properties of the formulations of the invention are at least equally good to those of a conventional sound deadening foam as exemplified in Comparative Example 1. However, from Table 1 it becomes apparent that the present formulations enable the use of more water as chemical blowing agent and have a significantly lower density despite the higher amount of polyisocyanate used in Comparative Example 12, which according to EP-A-0 731 120 should favour a lower density of the foam. Thus, with the formulations according to the present invention it is possible to produce polyurethane foams having sound absorption properties which are at least equally good to those of the conventional sound deadening foams but at lower quantities of material needed, thereby reducing the cost of the sound deadening foams.

What is claimed is:

1. A process for the preparation of a flexible polyurethane foam for use in sound deadening applications, which process comprises the steps of:

reacting about 100 parts by weight of a polyol combination, from about 2 to about 6 parts by weight of water, from about 0 to about 3 parts by weight of crosslinking agent(s) and a polyisocyanate component at an isocyanate index in the range of from about 60 to less than 80, in the presence of from about 0.01 to about 2.5 parts by weight of polyurethane catalyst(s) and optionally further usual auxiliaries, in which process the polyol combination comprises up to a total of about 100 parts by weight:

(1) from about 95.1 to about 99.9 parts by weight of a first polyol having a nominal average functionality higher than about 4.5, an equivalent molecular weight in the range of from about 1500 to about 2500, a hydroxyl value in the range of from about 25 to about 35 mg KOH/g and an ethylene oxide content in the range of from about 10 to about 30% by weight based on total weight of said first polyol, and (2) from about 0.1 to about 4.9 parts by weight of a second polyol having a nominal average functionality in the range of from about 2.2 to about 6, an equivalent molecular weight in the range of from about 1000 to about 3000 and an ethylene oxide content of at least about 50% by weight based on total weight of said second polyol, wherein the polyol combination is essentially free of stably dispersed polymer particles.

2. The process of claim 1, wherein said first polyol has a nominal average functionality in the range of about 5 to about 7.

3. The process of claim 1, wherein said first polyol has a hydroxyl value in the range of from about 28 to about 32 mg KOH/g.

4. The process of claim 1, wherein ethylene oxide present in said first polyol is present as terminal poly(oxyethylene) moieties.

5. The process of claim 1, wherein said second polyol has an ethylene oxide content of at least about 65%.

6. The process of claim 1, in which the polyol combination comprises, up to a total of about 100 parts by weight, from about 96.5 to about 98.5 parts by weight of said first polyol and from about 1.5 to about 3.5 parts by weight of said second polyol.

7. The process of claim 1, wherein said second polyol has an ethylene oxide content less than about 90%.

8. A foam obtained by a process as claimed in claim 1.

9. The process of claim 1, which process further comprises the steps of intimately mixing all components but the polyisocyanate, then adding the polyisocyanate and mixing this with the polyol formulation for such a short time that no foam formation occurs, subsequently injecting the resulting reaction mixture into a mould where the foaming reaction takes place and the shaped polyurethane article is formed and finally releasing the shaped article from the mould.

10. The shaped polyurethane article obtained by the process of claim 9.

* * * * *